Figure 1:
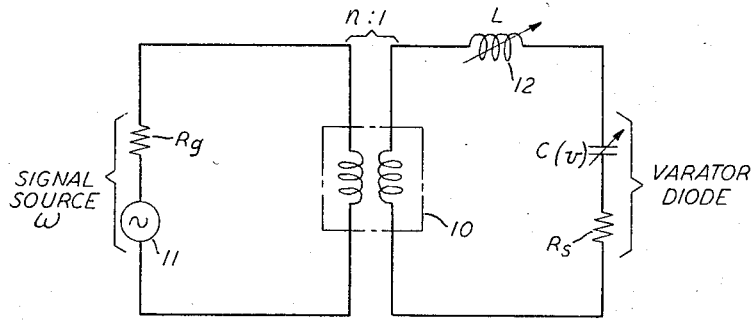

Oct. 25, 1966

MICHIYUKI UENOHARA 3,281,691

APPARATUS AND METHOD FOR DETERMINING VARACTOR DYNAMIC QUALITY
FACTOR BY MEASUREMENT OF VOLTAGE STANDING WAVE RATIO

Filed March 28, 1963

3 Sheets-Sheet 1

INVENTOR
M. UENOHARA
BY
Sylvan Sherman
ATTORNEY

United States Patent Office 3,281,691
Patented Oct. 25, 1966

3,281,691
APPARATUS AND METHOD FOR DETERMINING VARACTOR DYNAMIC QUALITY FACTOR BY MEASUREMENT OF VOLTAGE STANDING WAVE RATIO
Michiyuki Uenohara, Murray Hill, N.J., assignor to Bell Telephone Laboratories, Incorporated, New York, N.Y., a corporation of New York
Filed Mar. 28, 1963, Ser. No. 268,628
5 Claims. (Cl. 324—158)

This invention relates to electrical measuring techniques and, more particularly, to methods and apparatus for measuring the dynamic quality factor of varactor diodes.

In an effort to evaluate the potential usefulness of varactor diodes, A. Uhlir, in a paper entitled "The Potential of Semiconductor Diodes in High-Frequency Communications," published in the June 1958 issues of the Institute of Radio Engineers, has proposed as the figure of merit of a diode, a Q defined by $$Q = \frac{1}{\omega R_s C_{min}}$$

where $R_s$ is the spreading resistance of the diode, and $C_{min}$ its minimum capacity at the reverse breakdown voltage. For parametric device applications, however, it has been found that a dynamic quality factor, $\tilde{Q}$, is more appropriate than the conventional figure of merit defined by Uhlir. The dynamic quality factor is defined by $$\tilde{Q} = \frac{S_1}{2\omega R_s}$$

where $R_s$ is the spreading resistance of the diode and $S_1$ is the rate of change of the diode elastance at the bias point as given by the first order coefficient of the Fourier expansion of the diode elastance. (See "Minimum Noise Figure of the Variable-Capacitance Amplifier," by K. Kurokawa and M. Uenohara, Bell System Technical Journal, vol. 40, May 1961, page 698.)

Both of these diode evaluations are very time consuming to make and, in addition, require considerable technical skill. These are particularly important considerations when a large number of similar diodes are to be measured.

It is, accordingly, an object of this invention to simplify the method of evaluating the dynamic quality factor of varactor diodes.

It is a more specific object of this invention to provide a method and apparatus for measuring the dynamic quality factor of varactor diodes which do not require the attention of a highly skilled operator.

In accordance with the invention there is provided a test circuit whose parameters are adjusted so that the dynamic $\tilde{Q}$ is equal to the voltage standing wave ratio when the diode capacitance is resonated at some preselected bias.

The circuit adjustments are made for one of the diodes of a group of similar diodes to be measured. However, since the diode capacitance varies from diode to diode, the bias required to resonate each of the remaining diodes in the group will similarly vary. Accordingly, means are provided to automatically correct the measured $\tilde{Q}$ to the preselected bias.

These and other objects and features, the nature of the present invention and its various advantages, will appear more fully upon consideration of the accompanying drawings and the following detailed description of these drawings.

Figure 2:
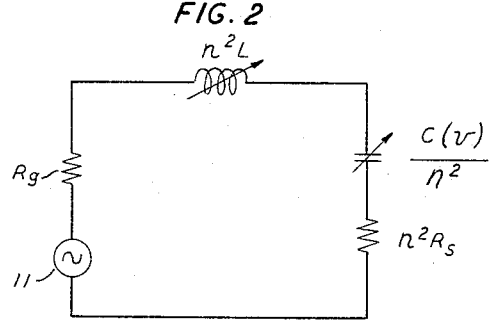
Figure 3:
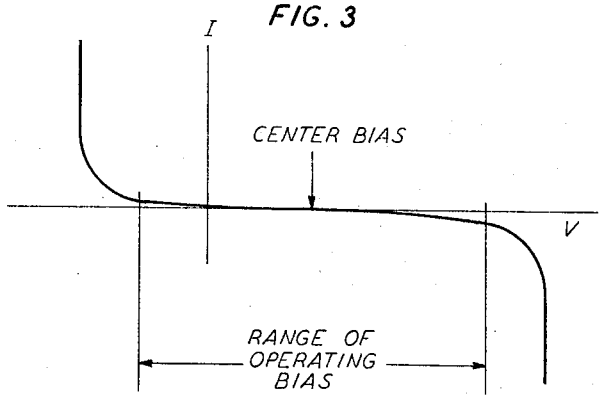
Figure 4:
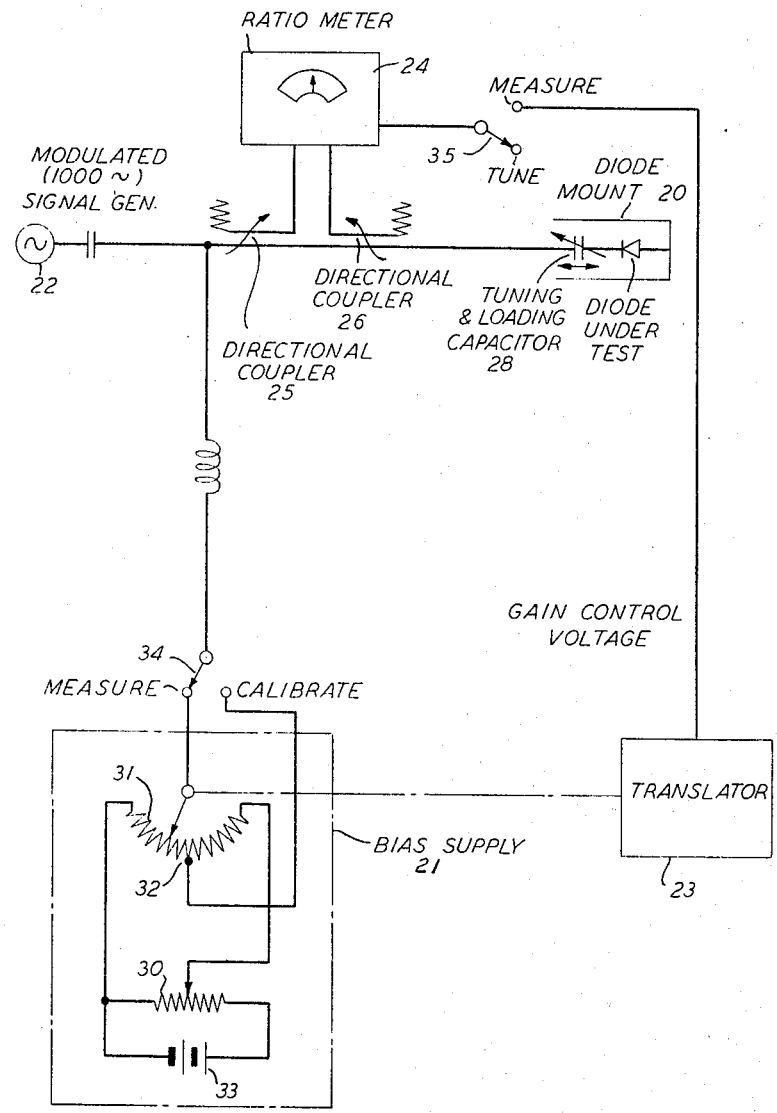
Figure 5:
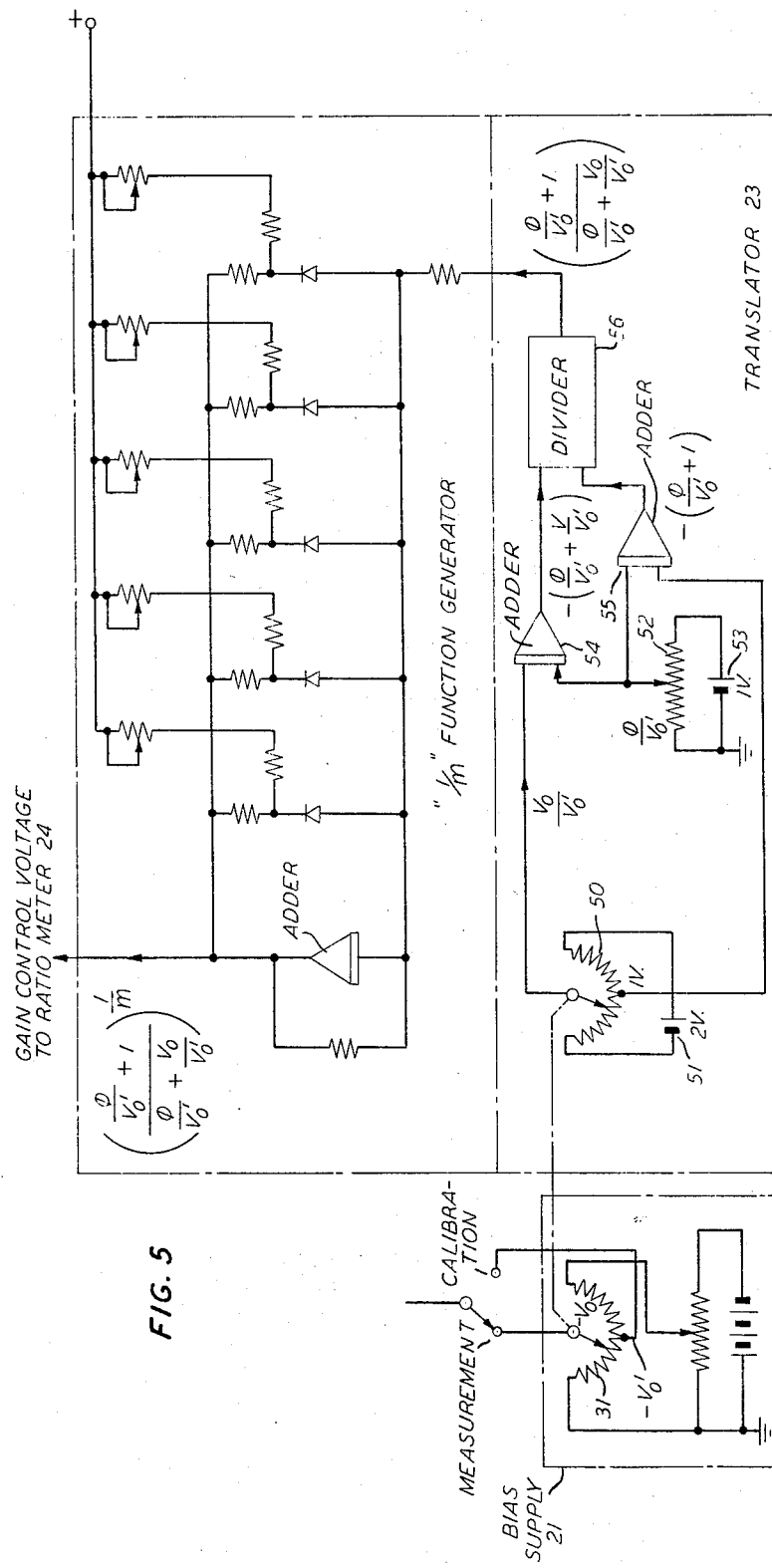

In the drawings:
FIGS. 1 and 2, given for purposes of explanation, are equivalent circuits of a typical diode measuring apparatus;
FIG. 3, given for purposes of explanation, shows the current-voltage characteristic of a typical varactor diode;
FIG. 4 is a combination block and schematic diagram of apparatus for measuring the dynamic $\tilde{Q}$ of a diode in accordance with the invention; and
FIG. 5, given for purposes of explanation, is a combination schematic and block diagram of a voltage translator for use in connection with the apparatus of FIG. 4.

Referring to FIG. 1, there is shown an equivalent circuit of a diode measuring apparatus. In the figure $C(v)$ and $R_s$ represent the capacitance and the resistance of the diode to be measured. In practice, $R_s$ would include the loss of the diode test mount. However, this can be made small compared to the series resistance of the diode itself. Generator 11 and resistance $R_g$ represent a signal source and its equivalent output impedance. Inductor 12 is a tuning inductor for resonating the varactor diode at the signal frequency, $\omega$, and transformer 10 is indicative of any impedance transformation $n^2$ associated with the circuit.

The transformer in FIG. 1 can be eliminated and all components referred to the primary side of the transformer as shown in FIG. 2.

For purposes of analysis, the junction elastance $S(v)$ of the diode is used instead of its capacitance $C(v)$. Thus, when the diode is pumped by a voltage at frequency $\omega_p$, $$S(v) = \frac{1}{C(v)} = S_0 + S_1 \cos \omega_p t \quad (1)$$

where $S_0$ is the elastance at the resonance bias, and $S_1$ is the rate of change of the elastance at the resonance bias.

At the maximum negative pump voltage, the maximum elastance $S_{max}$ is $$S_{max} = S_0 + S_1 \quad (2)$$

and at the maximum positive pump voltage, the elastance is a minimum given by $$S_{min} = S_0 - S_1 \quad (3)$$

If the series inductance is adjusted so that the circuit is resonant at the center bias voltage, i.e., $$n^2 \omega L = \frac{n^2 S_0}{\omega} \quad (4)$$

the diode impedances, as viewed at the generator, are $$Z_1 = n^2 R_s - j\frac{n^2 S_1}{\omega} \quad (5)$$

at the maximum negative bias voltage, and $$Z_2 = n^2 R_s + j\frac{n^2 S_1}{\omega} \quad (6)$$

at the maximum positive bias voltage.

With the dynamic quality factor, $\tilde{Q}$, defined as $$\tilde{Q} = \frac{S_1}{2\omega R_s} \quad (7)$$

$\tilde{Q}$ can be determined by measuring $Z_1$ and $Z_2$ since $$\frac{|Z_1 - Z_2|}{2|Z_1 + Z_2|} = \frac{\frac{2n^2 S_1}{\omega}}{(2)(2n^2 R_s)} = \frac{S_1}{2\omega R_s} \quad (8)$$

The center expression given by Equation 8 can be modified, however, by multiplying the numerator and denominator by $R_g$, the generator impedance, to give $$\frac{1}{2}\left(\frac{n^2 S_1}{\omega R_g}\right)\left(\frac{R_g}{n^2 R_s}\right) \qquad (9)$$

Since $R_g > R_s$, if $R_g > n^2 R_s$, then the ratio $R_g/n^2 R_s$ is simply the voltage standing wave ratio (VSWR) and the dynamic $\tilde{Q}$ is simply $$\tilde{Q} = \left(\frac{n^2 S_1}{2\omega R_g}\right)(\text{VSWR}) \qquad (10)$$

Rewriting Equation 10 in terms of $C_0$, the diode capacitance and $\gamma$, which is a function of the impurity doping profile, gives $$\tilde{Q} = \frac{1}{2}\left(\frac{n^2 \gamma}{\omega R_g C_0}\right)(\text{VSWR}) \qquad (11)$$

where $$\gamma = S_1/S_0$$

and $$C_0 \cong 1/S_0$$

As can be seen from Equation 11, the dynamic $\tilde{Q}$ can be made equal to the VSWR if $$\frac{1}{2}\left(\frac{n^2 \gamma}{\omega R_g C_0}\right) = 1 \qquad (12)$$

Before proceeding with a discussion of the best method of satisfying Equation 12 and measuring the dynamic $\tilde{Q}$, a more detailed consideration of the several parameters would appear to be in order.

(1) The frequency $\omega$ at which the measurement is made is generally fixed at the center frequency of the signal band at which the diode is to be operated.

(2) $R_g$ is the output impedance of the signal generator used to make the measurements.

(3) $\gamma$ is a function of the doping profile of the diode and is either known (supplied by the manufacturer) or can be ascertained experimentally for one of the diodes of the group of diodes to be measured. It is assumed to be the same for all the diodes in the group.

(4) $C_0$ is the diode capacitance. In general, the diode capacitance varies from diode to diode. In addition, the diode capacitance varies as a function of bias. Thus, in order to compare diodes, all $\tilde{Q}$ measurements must be made at, or referred to, the same bias. The bias normally used in the so-called "center bias" as is defined below.

A typical diode has a current-voltage characteristic as shown in FIG. 3. From such a characteristic curve, the range of operating biases is defined as those biases for which the diode current is less than some prescribed amount. The center bias is merely the bias at the center of this range.

If a $\tilde{Q}$ measurement is made at a bias that is different than the bias at which $C_0$ is measured, a suitable correction must be made to refer all measurements to the same bias. The relationship between diode capacitance and bias is given by $$C_2 = C_1(\varphi - V_1)1/m(\varphi - V_2) - 1/m \qquad (13)$$

where $C_1$ is the capacitance at bias $V_1$,
$C_2$ is the capacitance at bias $V_2$,
$m$ is a constant (typically 2 for an abrupt junction diode and 3 for a graded junction diode), and $\varphi$ is the diode contact potential.

The diode capacitance $C_0$ can be measured on any suitable, low frequency impedance measuring device.

(5) The impedance transformation ratio $n^2$ is chosen to satisfy Equation 12.

One method of satisfying Equation 12 and measuring $\tilde{Q}$ involves setting the diode bias at center bias, retuning the diode circuit and readjusting $n^2$ for each diode. Since this would be a time consuming operation, a more practical method of measurement involves maintaining $n^2$ constant and adjusting the diode capacitance (to tune the diode circuit) by appropriately selecting the bias voltage.

When this latter procedure is followed, the resulting $\tilde{Q}$ measurement will be made at a resonant bias that is different than the center bias and, is indicated above, a suitable correction must be made to refer the measurement back to center bias.

From Equation 11, it is seen that $\tilde{Q}$ varies inversely as capacitance. Thus $$\tilde{Q} = \tilde{Q}_m\left(\frac{C_0}{C_0'}\right) \qquad (14)$$

where $\tilde{Q}$ is dynamic quality factor at center bias, $\tilde{Q}_m$ is dynamic quality factor measured at resonant bias, $C_0$ is diode capacitance at resonant bias, $C_0'$ is diode capacitance at center bias.

The ratio $$\frac{C_0}{C_0'}$$

can be computed from Equation 13 as $$\frac{C_0}{C_0'} = \left[\frac{(\varphi - V_0')}{(\varphi - V_0)}\right]^{1/m} \qquad (15)$$

where $V_0$ is the voltage at resonant bias corresponding to capacitance $C_0$, and $V_0'$ is the center bias voltage for which the diode capacitance is $C_0'$.

When both $V_0$ and $V_0'$ are negative voltages, Equation 15 can be rewritten as $$\frac{C_0}{C_0'} = \left[\frac{\left(\frac{\varphi}{|V_0'|}+1\right)}{\left(\frac{\varphi}{|V_0'|}+\frac{|V_0|}{|V_0'|}\right)}\right]^{1/m} \qquad (16)$$

Apparatus for automatically correcting the $\tilde{Q}$ measurement is shown in FIG. 4 and comprises a diode mount 20, a bias supply 21, a modulated signal generator 22, a translator 23, a ratio meter 24, and its associated directional couplers 25 and 26.

The diode mount 20 is pretuned to the frequency of the signal generator 22, and preloaded to provide the proper impedance transformation ratio to satisfy Equation 12, by adjusting the location and magnitude of a tuning and loading capacitance 28. The tuning and loading procedure is done but once for a reference diode (merely one of the group of similar diodes to be measured) at center bias. Thereafter, changes in capacitance from diode to diode are compensated for by adjusting the bias.

The bias supply 21 is an adjustable direct current supply having two potentiometers 30 and 31. The first potentiometer 30, connected across a direct current source 33, is adjusted so that the voltage at the center tap 32 of the second potentiometer 31 is the center bias voltage for the reference diode. Once adjusted, the first potentiometer is no longer adjusted during subsequent measurements for a group of similar diodes. The second potentiometer 31 is used to adjust the bias for the diode under test. In particular, it is adjusted to resonate the diode. To the extent that the bias required to resonate the diode differs from the center bias, the resulting $\tilde{Q}$ measurement must be corrected. This is done by the translator 23 as will be explained hereinbelow.

The translator 23 is ganged to the bias supply so as to generate a voltage that is proportional to the ratio of the actual bias voltage applied to the diode under test and the center bias voltage. The translator, in turn, produces an output voltage that is proportional to the capacitance ratio of the reference diode capacitance at center bias to the test diode capacitance at center bias as given by Equation 16. This output voltage is fed to one of the amplifier stages in ratio meter 24 and is used to control the gain of the amplifier. This gain control provides a correction to the measured standing wave ratio so that the indicator reads the corrected dynamic Q of the diode directly.

FIG. 5 is an illustrative schematic diagram of apparatus which includes a translator and a bias supply for making the voltage transformation described above. The bias potentiometer 31 is ganged to a potentiometer 50 in the translator. Potentiometer 50 is connected across a two volt direct current source 51. So connected, the output voltage from potentiometer 50 is equal to the ratio of the resonant bias to the center bias, $V_0/V_0'$. A second potentiometer 52 is connected across a one volt direct current source 53. Potentiometer 52 is adjusted so that its output voltage is equal to the ratio of the contact potential $\varphi$ and the center bias voltage $V_0'$.

The output voltages from potentiometers 50 and 52 are summed in adder 54. The output from potentiometer 52 is added, in adder 55, to a one volt signal derived from the center tap on potentiometer 50. The output from adder 54 is divided by the output from adder 55 in divider 56. The ratio thus obtained is then applied to the "$1/m$" function generator to produce an output gain control voltage that is proportional to the capacitance ratio given by Equation 16. (For a discussion of dividers and function generators see "Analog Computation in Engineering Design" by A. E. Rogers and T. W. Connolly, McGraw-Hill, New York, 1960.)

The ratio meter 24 and its associated directional couplers 25 and 26 measure the VSWR. Any one of a number of commercially available ratio meters, modified to utilize the gain control voltage from translator 23 can be used. Typical of such meters is the Hewlett-Packard Model 416A. Referring to the "Operating and Service Manual" for the Model 416A meter published November 1961, the translator gain control voltage is injected into the grid circuit of tube V2B by replacing the one megohm potentiometer R32 with a 0.5 megohm potentiometer in series with a 0.5 megohm fixed resistor. The gain control voltage is injected at the junction of the potentiometer and the fixed resistor.

To measure a group of similar diodes, $\gamma$, $C_0$ and $R_s$ for one of the diodes in the group must be ascertained either from the manufacturer or by prior art experimental means. (See, for example, "On the Use of Passive Circuit Measurements for the Adjustment of Variable-Capacitance Amplifiers," by K. Kurokawa, Bell System Technical Journal, January 1962.) Once these parameters are determined for the reference diode, the diode mount can be tuned and preloaded so satisfy Equation 12 at center bias. This is done with switch 34 in FIG. 4 in the calibrate position. In addition, the contact potential and the manner in which the reference diode capacitance varies as a function of bias is determined so that potentiometer 52 and the function generator in the translator can be properly adjusted.

With the measuring equipment so adjusted, measurements can then be made on the remaining diodes in the group as follows:

(1) Switch 35 in FIG. 4 is placed in "tune" position to remove the gain control voltage, which is proportional to $$\frac{C_0}{C_0'}$$

from ratio meter 24.

(2) Switch 34 is placed in the "measure" position.
(3) The diode to be measured is mounted in diode mount 20.
(4) Potentiometer 41 is adjusted to bias the diode being measured to resonance. This is indicated by a minimum VSWR indication on the ratio meter.
(5) So biased, switch 35 is switched to "measure" and the VSWR scale is read directly. Since Equation 12 is satisfied, this reading is also the dynamic $\widetilde{Q}$ reading, automatically corrected to center bias by means of the gain control voltage derived from the translator.

While the invention was described utilizing a translator for automatically correcting the measured $\widetilde{Q}_{meas.}$ to center bias, it is understood that the correction can alternatively be calculated using equation 14.

Similarly, whereas a ratio meter and directional couplers are used to measure the VSWR, it is recognized that other means such as a probe and a simple amplifier can be alternatively used for this purpose. Thus, in all cases, it is understood that the above-described arrangement is merely illustrative of but one of the many specific embodiments which can represent applications of the principle of the invention. Numerous and varied other arrangements can readily be devised in accordance with these principles by those skilled in the art without departing from the spirit and scope of the invention.

What is claimed is:
1. Apparatus for measuring the dynamic quality factor of a varactor diode at a given frequency $\omega$ comprising:
   a diode circuit including said diode and a diode mount;
   a transmission line adapted to connect a source of wave energy to said circuit;
   means for applying a bias to said diode;
   means for resonating said diode circuit at said given frequency and for adjusting the impedance transformation ratio $n^2$ of said resonant diode circuit such that

$$\tfrac{1}{2}\left(\frac{n^2\gamma}{\omega C_0 R_g}\right)=1$$

where
   $\gamma$ is a constant for said diode which depends upon the impurity doping profile,
   $R_g$ is the output resistance of said source,
   and
   $C_0$ is the diode capacitance;
   and means for measuring the voltage standing wave ratio along said transmission line.

2. Apparatus for measuring the dynamic quality factor of a varactor diode at a given bias voltage $V_0'$ and at a given frequency $\omega$ comprising:
   a diode circuit including said diode and a diode mount;
   said diode circuit having an impedance transformation ratio at said given frequency such that $$\tfrac{1}{2}\left(\frac{n^2\gamma}{\omega C_0 R_g}\right)=1$$

where
   $\gamma$ is a constant for said diode which depends on the impurity doping profile,
   $R_g$ is the output resistance of said source,
   and
   $C_0$ is the capacitance required to resonate said circuit at said given frequency;
   a transmission line adapted to connect a source of wave energy to said circuit;
   means for biasing said diode at a voltage $V_0$ to resonate said diode circuit at said given frequency;

means for measuring the voltage standing wave ratio along said transmission line;

and means for referring the standing wave ratio measured at said voltage $V_0$ to said given bias voltage $V_0'$.

3. Apparatus according to claim 2 wherein; said means for referring said measured standing wave ratio to said given bias comprises means for multiplying said measured standing wave ratio by the factor $$\left[\frac{(\varphi-V_0')}{(\varphi-V_0)}\right]^{\frac{1}{m}}$$

where
$\varphi$ is the contact potential for said diode
and
$m$ is a constant for said diode.

4. A method of measuring the dynamic quality factor of a varactor diode at a frequency $\omega$ and at a given bias $V'_0$ comprising the steps of:

tuning and loading the diode test circuit such that $$\tfrac{1}{2}\left(\frac{n^2\gamma}{\omega R_g C_0}\right)=1$$

where
$n^2$ is the impedance transformation ratio of the test circuit,
$\gamma$ is a constant for the type of diode,
$R_g$ is the output resistance of a signal source for energizing said circuit at frequency $\omega$,
and
$C_0$ is the capacitance required to resonate the test circuit;

inserting the diode to be measured in said test circuit;
biasing said diode at a voltage $V_0$ to resonate said test circuit at frequency $\omega$;
measuring the standing wave ratio along the transmission line connecting said signal source to said test circuit;
correcting said measured standing wave ratio to said given bias $V_0'$ by multiplying said measured standing wave ratio by a factor $$\left[\frac{(\varphi-V_0')}{(\varphi-V_0)}\right]^{\frac{1}{m}}$$

where
$\varphi$ is the contact potential for said diode,
and
$m$ is a constant which depends upon the nature of the diode junction.

5. Apparatus for measuring the dynamic quality factor of a diode comprising:

a source of wave energy;
a diode test circuit;
a transmission line connecting said source to said test circuit;
first and second directional couplers located along said line for measuring the amplitude of the wave energy directed to, and reflected from, said test circuit;
a ratio meter connected to said directional couplers for indicating the voltage standing wave ratio along said line;
a bias source for biasing the diode being measured;
and a translator for modifying the measured voltage standing wave ratio in accordance with the relationship $$\left[\frac{(\varphi-V_0')}{(\varphi-V_0)}\right]^{\frac{1}{m}}$$

where
$\varphi$ is the contact potential of the diode being measured,
$m$ is a constant of said diode;
$V_0$ is the bias voltage applied to said diode,
and
$V_0'$ is a preselected reference voltage.

References Cited by the Examiner

Bell Systems Technical Journal (Kurokawa, Vol. 41, No. 1, January 1962, pages 361–381 (page 371 relied upon).

WALTER L. CARLSON, *Primary Examiner.*

E. L. STOLARUN, *Assistant Examiner.*